United States Patent
Itogawa et al.

(10) Patent No.: US 12,321,124 B2
(45) Date of Patent: Jun. 3, 2025

(54) IMAGE FORMING APPARATUS, IMAGE FORMING SYSTEM, AND NON-TRANSITORY COMPUTER-READABLE STORAGE MEDIUM

(71) Applicant: BROTHER KOGYO KABUSHIKI KAISHA, Nagoya (JP)

(72) Inventors: Yoshihiro Itogawa, Mizuho (JP); Satoshi Esaki, Kanazawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/174,733

(22) Filed: Feb. 27, 2023

(65) Prior Publication Data

US 2023/0221674 A1 Jul. 13, 2023

Related U.S. Application Data

(63) Continuation of application No. PCT/JP2021/030914, filed on Aug. 24, 2021.

(30) Foreign Application Priority Data

Aug. 31, 2020 (JP) .................................. 2020-146286

(51) Int. Cl.
*G06F 3/12* (2006.01)
*B41J 29/38* (2006.01)
(Continued)

(52) U.S. Cl.
CPC ......... *G03G 15/80* (2013.01); *G03G 15/5079* (2013.01); *G06F 3/1212* (2013.01);
(Continued)

(58) Field of Classification Search
None
See application file for complete search history.

(56) References Cited

U.S. PATENT DOCUMENTS 5,850,245 A 12/1998 Goto et al.
6,172,762 B1 * 1/2001 Uchiyama .......... G03G 15/2003
358/1.14

(Continued)

FOREIGN PATENT DOCUMENTS

EP 1107104 A2 6/2001
JP H06115220 A 4/1994
(Continued)

OTHER PUBLICATIONS

International Preliminary Report on Patentability and Written Opinion dated Feb. 28, 2023 issued in PCT/JP2021/030914.
(Continued)

*Primary Examiner* — Beniyam Menberu
(74) *Attorney, Agent, or Firm* — Scully, Scott, Murphy & Presser, PC

(57) ABSTRACT

An MFP 1 includes an image forming unit 4 which forms an image on a sheet S1, a USB interface 12 which is to be connected to a PC 101 via a USB and receives a preceding command described in accordance with a control transfer protocol that is a transfer scheme of USB connection, and a CPU 91 which executes a preparation operation of the image forming unit 4, in response to receiving the preceding command by the USB interface 12. The preceding command is described to instruct the preparation operation of the image forming unit 4.

8 Claims, 10 Drawing Sheets

(51) Int. Cl.
  *G03G 15/00* (2006.01)
  *G06K 15/02* (2006.01)
(52) U.S. Cl.
  CPC ............ *G06F 3/1248* (2013.01); *G06F 3/128* (2013.01); *G06F 3/1284* (2013.01); *G06F 3/1298* (2013.01); *G06F 3/1286* (2013.01)

(56) References Cited

U.S. PATENT DOCUMENTS

| | | | | |
|---|---|---|---|---|
| 8,161,213 B2 * | 4/2012 | Kadota | ................. | G06F 3/1204 710/62 |
| 2005/0271411 A1 | 12/2005 | Shibaki et al. | | |
| 2006/0192999 A1 * | 8/2006 | Kawai | ..................... | H04L 67/51 358/1.15 |
| 2007/0013947 A1 * | 1/2007 | Watanabe | ............. | G06F 3/1229 358/448 |
| 2008/0133808 A1 | 6/2008 | Fukunaga | | |
| 2008/0158581 A1 | 7/2008 | Ferlitsch | | |
| 2008/0244123 A1 | 10/2008 | Kadota | | |
| 2017/0297338 A1 | 10/2017 | Arakane | | |

FOREIGN PATENT DOCUMENTS

| | | | | | |
|---|---|---|---|---|---|
| JP | H08160828 A | | 6/1996 | | |
| JP | 2001088403 | * | 4/2001 | ............. | B41J 29/38 |
| JP | 2001150761 A | | 6/2001 | | |
| JP | 2003249975 | * | 9/2003 | ............. | B41J 29/38 |
| JP | 2006021527 A | | 1/2006 | | |
| JP | 2006218733 | * | 8/2006 | ............. | B41J 29/46 |
| JP | 2008211761 A | | 9/2008 | | |
| JP | 2008250736 A | | 10/2008 | | |
| JP | 2009300759 | * | 12/2009 | ............. | G03G 21/00 |
| JP | 2010082927 | * | 4/2010 | ............... | G06F 3/12 |
| JP | 2010111105 A | | 5/2010 | | |
| JP | 2011159047 | * | 8/2011 | ............... | G06F 3/12 |
| JP | 2015076731 | * | 4/2015 | ............. | H04L 12/46 |
| JP | 2017068549 | * | 4/2017 | ............... | H04N 1/00 |
| JP | 2017134741 | * | 8/2017 | ............. | G06F 13/00 |
| JP | 2017193053 A | | 10/2017 | | |
| JP | 2019117621 | * | 7/2019 | ............. | B41J 29/38 |

OTHER PUBLICATIONS

International Search Report dated Nov. 16, 2021 issued in PCT/JP2021/030914.

Japanese Reasons for Refusal dated Jun. 11, 2024 from related JP 2020-146286 together with an English language translation.

Office Action dated Nov. 19, 2024 received from the Japanese Patent Office, 6 pages.

* cited by examiner

IMAGE FORMING APPARATUS, IMAGE FORMING SYSTEM, AND NON-TRANSITORY COMPUTER-READABLE STORAGE MEDIUM

REFERENCE TO RELATED APPLICATIONS

This is a continuation application of International Application No. PCT/JP2021/030914 filed on Aug. 24, 2021 which claims priority from Japanese Patent Application No. 2020-146286 filed on Aug. 31, 2020. The entire contents of the earlier applications are incorporated herein by reference.

BACKGROUND ART

For an image forming apparatus, suggested is a technology of shortening a time after printing is instructed until a rear end of a first sheet is discharged, i.e., a so-called first print time. For example, suggested is a system in which an apparatus configured to instruct printing transmits a preceding command to instruct a printing preparation operation to an image forming apparatus prior to transmission of print data, so that the image forming apparatus starts the printing preparation operation in accordance with the preceding command before receiving the print data. The printing preparation operation is, for example, a temperature-raising operation of a heater of a fixing unit.

A print data supply apparatus causes a printer apparatus in a power saving mode to activate warm-up processing before spooling print data of a print job. In addition, the print data supply apparatus generates start-up data for setting a printable state, spools the same as a print job separate from the print data, and transmits it to the printer apparatus in advance.

In the case where an external terminal transmits the preceding command to the image forming apparatus, prior to the print data, the preceding command is described in the Printer Job Language (PJL). When analyzing a printer job language transmitted from the external terminal, it takes time for the image forming apparatus to perform processing for recognizing that the printer job language is a preceding command. For this reason, it takes time for the image forming apparatus to recognize that the printer job language is a preceding command and to start execution of the printing preparation operation.

DESCRIPTION

One aspect of the present disclosure is to execute a preparation operation of an image forming unit that forms an image on a sheet, sooner than a case where a preceding command is described in the Printer Job Language.

An image forming apparatus according to one aspect of the present disclosure includes an image forming unit configured to form an image on a sheet, a USB interface configured to be connected to an external terminal via a USB and to receive a preceding command described in accordance with a control transfer protocol that is a transfer scheme of USB connection, the preceding command being described to instruct a preparation operation of the image forming unit, and a controller configured to execute the preparation operation of the image forming unit, in response to receiving the preceding command by the USB interface.

The image forming apparatus receives the preceding command described in accordance with the control transfer protocol to instruct the preparation operation of the image forming unit. A data size of the preceding command described in accordance with the control transfer protocol is smaller than a data size of a preceding command described in a Printer Job Language. For this reason, the image forming apparatus can recognize the preceding command and execute the preparation operation of the image forming unit, sooner than a case where the preceding command is described in the Printer Job Language.

The controller may be configured to execute analysis processing of analyzing received data transmitted from the external terminal and described in the Printer Job Language, the received data being received in a bulk OUT transfer, and to execute, in a case where the analyzed received data is print data, an image forming operation of forming an image of the print data on the sheet, using the image forming unit, and to execute, in a case where the analyzed received data is not the print data, processing in accordance with a PJL command in the received data, the PJL command being described in the Printer Job Language.

The image forming apparatus can execute the image forming operation by analyzing the received data described in the Printer Job Language and received in the bulk OUT transfer and can execute the processing in accordance with the PJL command.

The image forming unit may include a fixing unit having a heater and configured to heat a sheet on which an image is formed, using the heater, and the preceding command may include a heater driving command that is a command to instruct a driving operation of the heater as the preparation operation of the image forming unit.

The image forming apparatus can recognize the preceding command and execute the driving operation of the heater as the preparation operation of the image forming unit sooner than the case where the preceding command is described in the Printer Job Language.

The image forming unit may include a photosensitive member, a polygon mirror configured to deflect a light beam in a direction heading toward the photosensitive member, and a polygon motor configured to rotationally drive the polygon mirror, and the preceding command may include a motor driving command that is a command to instruct a driving operation of the polygon motor as the preparation operation of the image forming unit.

The image forming apparatus can recognize the preceding command and execute the driving operation of the polygon motor as the preparation operation of the image forming unit sooner than the case where the preceding command is described in the Printer Job Language.

An image forming system according to one aspect of the present disclosure includes an image forming apparatus and an external terminal. The image forming apparatus includes an image forming unit configured to form an image on a sheet, a USB interface configured to be connected to the external terminal via a USB and to receive a preceding command described in accordance with a control transfer protocol that is a transfer scheme of USB connection, the preceding command being described to instruct a preparation operation of the image forming unit, and a controller configured to execute the preparation operation of the image forming unit, in response to receiving the preceding command by the USB interface. The external terminal is configured to transmit the preceding command to the image forming apparatus in a case where the external terminal receives a printing instruction.

A non-transitory storage medium according to one aspect of the present disclosure is a computer-readable storage medium storing a program executable by a computer of the external terminal and used for controlling the image forming system, the program including instructions that, when executed by the computer, cause the external terminal to perform transmitting the preceding command to the image forming apparatus.

According to one aspect of the present disclosure, it is possible to execute the preparation operation of the image forming unit that forms an image on the sheet sooner than the case where the preceding command is described in the Printer Job Language.

FIRST EMBODIMENT

<Configuration of Image Forming System 100>

Figure 1:
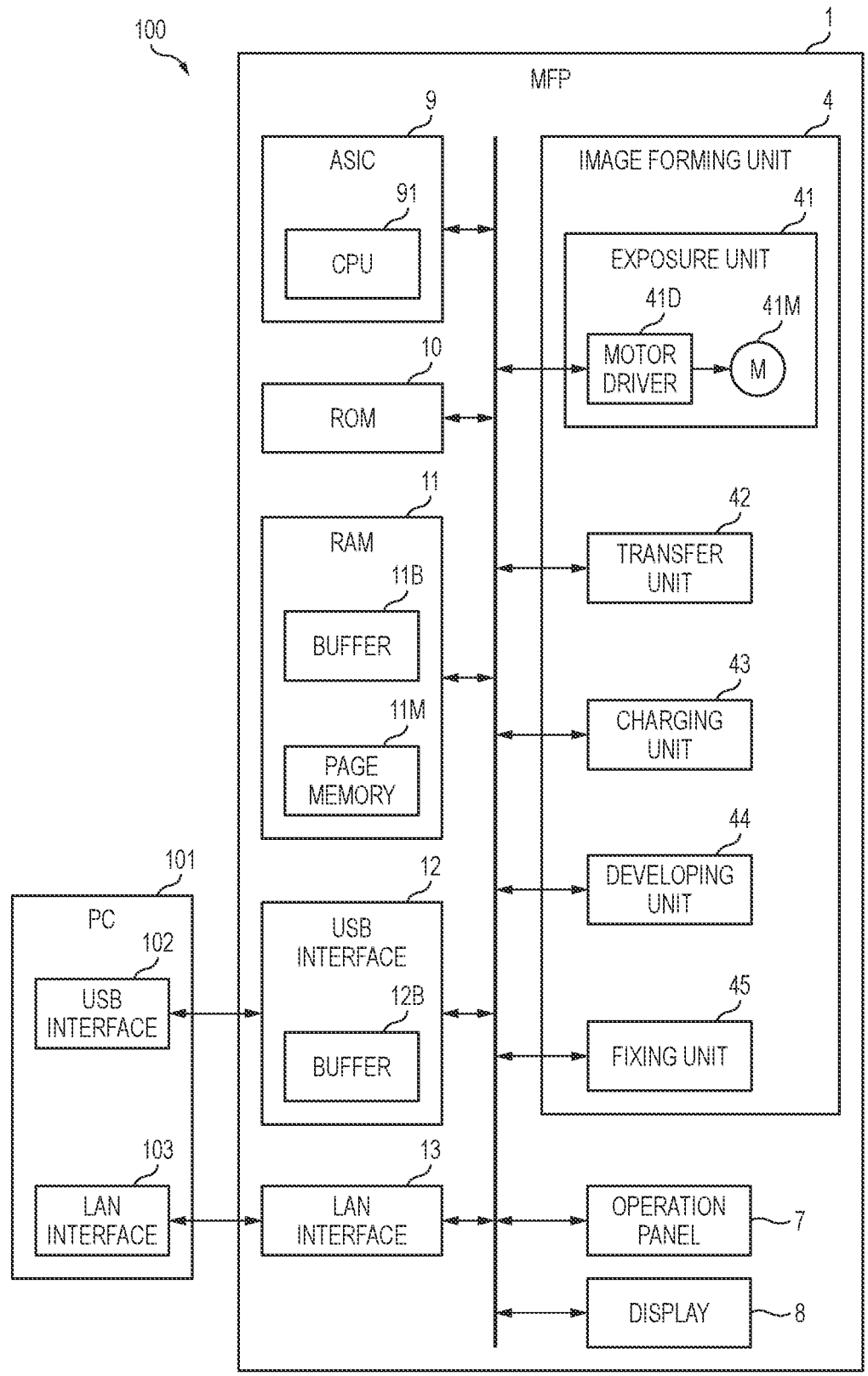
FIG. 1 is a block diagram showing an electrical configuration of an MFP and a PC of an image forming system.
Figure 2:
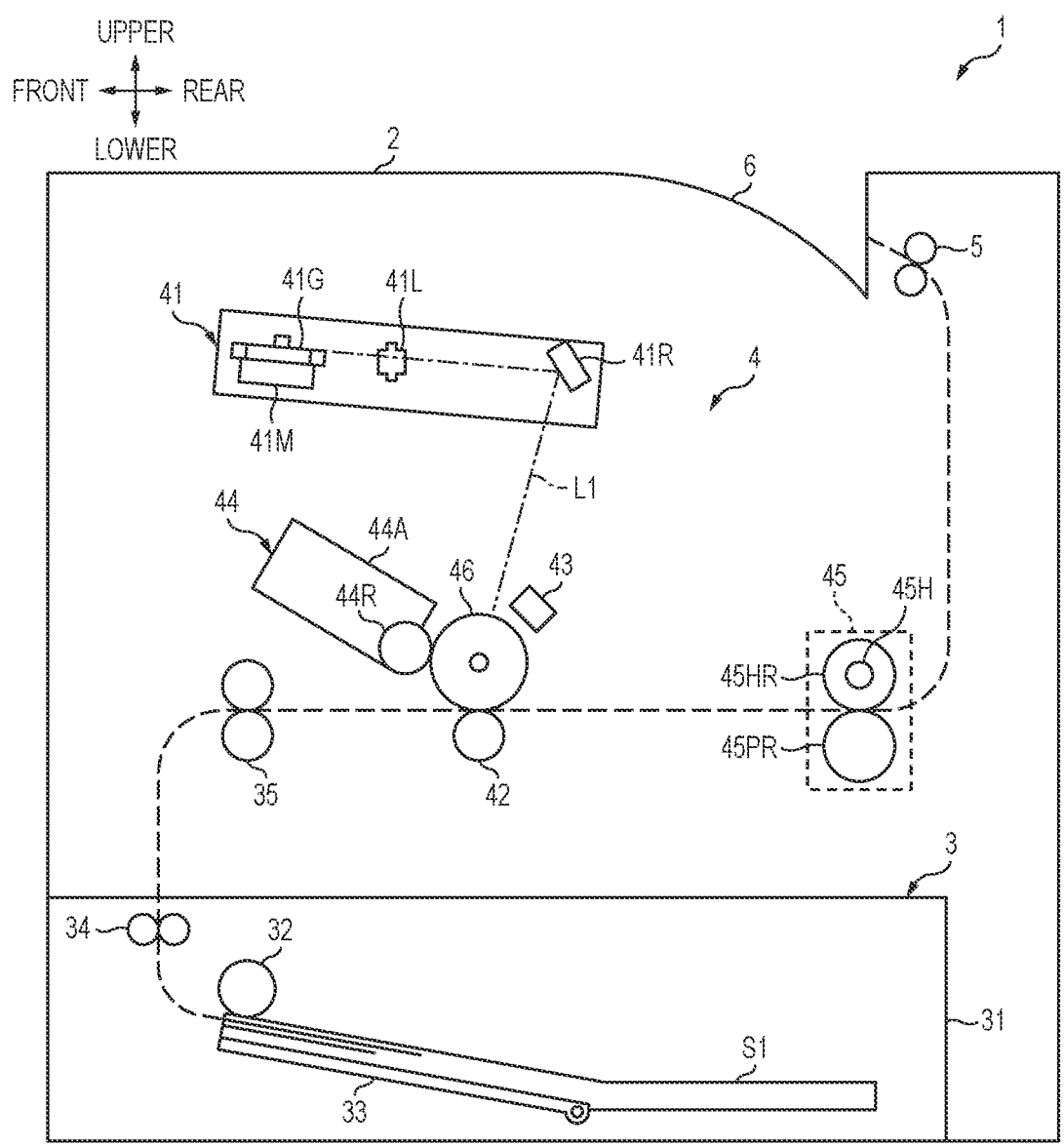
FIG. 2 shows an internal configuration of the MFP shown in FIG. 1.

FIG. 1 is a block diagram showing an electrical configuration of an MFP (Multi-Function Peripheral) 1 and a PC 101 of an image forming system 100 according to a first embodiment of the present disclosure. FIG. 2 shows an internal configuration of the MFP 1 shown in FIG. 1. As shown in FIG. 1, an image forming system 100 is a system including the MFP 1 and the personal computer (PC) 101. The PC 101 is an example of the external terminal. As the external terminal, for example, a portable information terminal such as a smart phone or a tablet may also be used, in addition to the PC 101.

The MFP 1 shown in FIGS. 1 and 2 is an example of the image forming apparatus configured to form an image on a sheet S1 such as paper or an OHP (Over Head Projector) sheet. The MFP 1 is a laser printer configured to form a monochromatic developer image on the sheet S1, but is not limited thereto. For example, the MFP 1 may be a laser printer configured to form a polychromatic developer image on the sheet S1. The sheet S1 is an example of the sheet. Hereinafter, for convenience of description, the upper and lower direction and the front and rear direction of the MFP 1 are defined as indicated by arrows in FIG. 2.

As shown in FIGS. 1 and 2, the MFP 1 includes a body housing 2, a sheet feeding unit 3, an image forming unit 4, a discharge roller 5, a discharge tray 6, an operation panel 7, a display 8, an ASIC (Application Specific Integrated Circuit) 9, a ROM (Read Only Memory) 10, a RAM (Random Access Memory) 11, a USB (Universal Serial Bus) interface 12, a buffer 12B, and a LAN (Local Area Network) interface 13. The body housing 2 is configured to accommodate each of the above units.

The sheet feeding unit 3 is configured to deliver the sheet S1. The sheet feeding unit 3 includes a tray 31, a feed roller 32, a sheet pressing plate 33, a conveying roller 34, and a registration roller 35. The tray 31 is a sheet tray configured to accommodate the sheet S1. The feed roller 32 is a feed roller configured to deliver the sheet S1 accommodated in the tray 31.

When delivering the sheet S1, the sheet S1 on the tray 31 is pressed against the feed roller 32 by the sheet pressing plate 33 and is fed to the conveying roller 34 as the feed roller 32 rotates. The conveying roller 34 is configured to convey the sheet S1 toward the registration roller 35. The registration roller 35 is configured to convey the sheet S1 toward the image forming unit 4 after aligning a position of a tip end of the sheet S1.

The image forming unit 4 is configured to form an image on the sheet S1 delivered by the sheet feeding unit 3. As shown in FIG. 2, the image forming unit 4 includes an exposure unit 41, a transfer unit 42, a charging unit 43, a developing unit 44, a fixing unit 45, and a photosensitive member 46. The exposure unit 41 includes a laser light source (not shown), a polygon mirror 41G, a scanning lens 41L, a polygon motor 41M, and a reflector 41R.

The polygon mirror 41G is a rotating multi-faceted mirror having sides of a regular hexagonal prism as six reflective surfaces. The polygon mirror 41G is to deflect a light beam L1 emitted from the laser light source toward the photosensitive member 46. The polygon motor 41M is configured to rotationally drive the polygon mirror 41G. A motor driver 41D of FIG. 1 provided in the exposure unit 41 is configured to drive the polygon motor 41M.

The exposure unit 41 is configured to deflect the light beam L1 by the polygon mirror 41G, and to emit the light beam L1 from the polygon mirror 41G toward a surface of the photosensitive member 46 via the scanning lens 41L and the reflector 41R. The exposure unit 41 is configured to scan and expose the surface of the photosensitive member 46 by the light beam L1. Thereby, an electrostatic latent image is formed on the photosensitive member 46. The polygon motor 41M is a brushless DC motor.

The transfer unit 42 is a transfer roller configured to sandwich the sheet S1 between the transfer unit and the photosensitive member 46. The charging unit 43 is a scorotron-type charger having a charging wire and a grid unit, which are not shown. A charging voltage is applied to the charging wire and a grid voltage is applied to the grid unit by a high voltage generation circuit (not shown), whereby a corona discharge is generated and the surface of the photosensitive member 46 is uniformly charged. The developing unit 44 has a developing roller 44R and a developer accommodation part 44A.

In the image forming unit 4, after the surface of the photosensitive member 46 is uniformly charged by the charging unit 43, an electrostatic latent image based on image data is formed on the photosensitive member 46 by the light beam L1 from the exposure unit 41. In addition, the developing roller 44R is configured to supply developer in the developer accommodation part 44A to the photosensitive member 46 having the electrostatic latent image formed thereon. Thereby, the electrostatic latent image is visualized, and a developer image is formed on the photosensitive member 46. Thereafter, the sheet S1 fed from the sheet feeding unit 3 is conveyed to a transfer position between the photosensitive member 46 and the transfer unit 42, so that the developer image formed on the photosensitive member 46 is transferred onto the sheet S1.

The sheet S1 having the developer image transferred thereon is conveyed to the fixing unit 45 by the photosensitive member 46 and the transfer unit 42. The fixing unit 45 is configured to thermally fix the developer image on the sheet S1 conveyed from the photosensitive member 46 and the transfer unit 42. The fixing unit 45 includes a heating roller 45HR, a pressure roller 45PR, and a heater 45H. The fixing unit 45 heats the sheet S1 on which an image is formed, using the heater 45H.

The heating roller 45HR is configured to heat the sheet S1. The pressure roller 45PR is configured to hold the sheet S1 between the pressure roller and the heating roller 45HR. In the heating roller 45HR, the heater 45H for raising a temperature of the heating roller 45HR is arranged. The heater 45H is, for example, a halogen lamp. In the fixing unit 45, the sheet S1 having the developer image transferred thereon is conveyed between the heating roller 45HR and the pressure roller 45PR, so that the developer image is thermally fixed on the sheet S1. The sheet S1 having the developer image thermally fixed thereon is discharged onto the discharge tray 6 by the discharge roller 5.

The fixing unit 45 is not limited to the configuration including the heating roller 45HR, the heater 45H for raising the temperature of the heating roller 45HR, and the pressure roller 45PR. The fixing unit may have a configuration including a heater, a nip plate configured to receive radiant heat from the heater, a heating belt configured to rotate around the nip plate, and a pressure roller. The fixing unit may have a configuration including a substrate provided with a heating pattern, a belt configured to rotate around the substrate, and a pressure roller, in which the substrate and the belt are in contact with each other. The fixing unit may have a configuration including a heating roller, a heater for raising a temperature of the heating roller, and a pressure belt.

Returning to FIG. 1, the ASIC 9 has a built-in CPU (Central Processing Unit) 91 as an example of the controller. The controller may be an ASIC 61 having a logic circuit. The ASIC 9 is electrically connected to the motor driver 41D, the transfer unit 42, the charging unit 43, the developing unit 44, the fixing unit 45, the operation panel 7, the display 8, the ROM 10, the RAM 11, the USB interface 12 and the LAN interface 13.

The CPU 91 is configured to execute overall control on each unit of the MFP 1. In the ROM 10, various control programs, various settings and the like for controlling the MFP 1 are stored. The RAM 11 has a buffer 11B and a page memory 11M. The buffer 11B is configured to temporarily store data received from the PC 101. The page memory 11M is configured to store raster data generated from print data by the CPU 91.

The print data is data representing a content of image formation that is executed by the MFP 1. The print data includes, for example, PDF data for which a file format called PDF (Portable Document Format) is used. In PDF data, an image is described in accordance with a page description language based on PostScript (registered trademark), and a plurality of operators relating to drawing of a character string, a figure, an image and the like are aligned in order of processing.

The USB interface 12 is an example of the USB interface. A USB cable is connected to the USB interface 12. The USB interface 12 is to be communicatively connected to a USB interface 102 of the PC 101. The CPU 91 can receive data transmitted from the USB interface 102 of the PC 101, via the USB cable. The USB interface 12 includes a buffer 12B. The USB interface 12 is configured to receive data from the USB interface 102 of the PC 101. The data received by the USB interface 12 is temporarily stored in the buffer 12B.

A LAN cable is connected to the LAN interface 13. The CPU 91 can receive data transmitted from the LAN interface 103 of the PC 101, via the LAN cable. The data received by the LAN interface 13 is stored in the buffer 11B.

Note that, the CPU 91 may be configured to receive data from the PC 101 using a wireless LAN. In this case, the CPU 91 is configured to receive data from the PC 101 via the LAN interface 13 by the wireless LAN. The operation panel 7 is to receive a user operation, and is configured to transmit a content of an operation received from the user to the CPU 91. The display 8 is configured to display a processing content of the MFP 1.

<Processing of Image Forming System 100>

Figure 3:
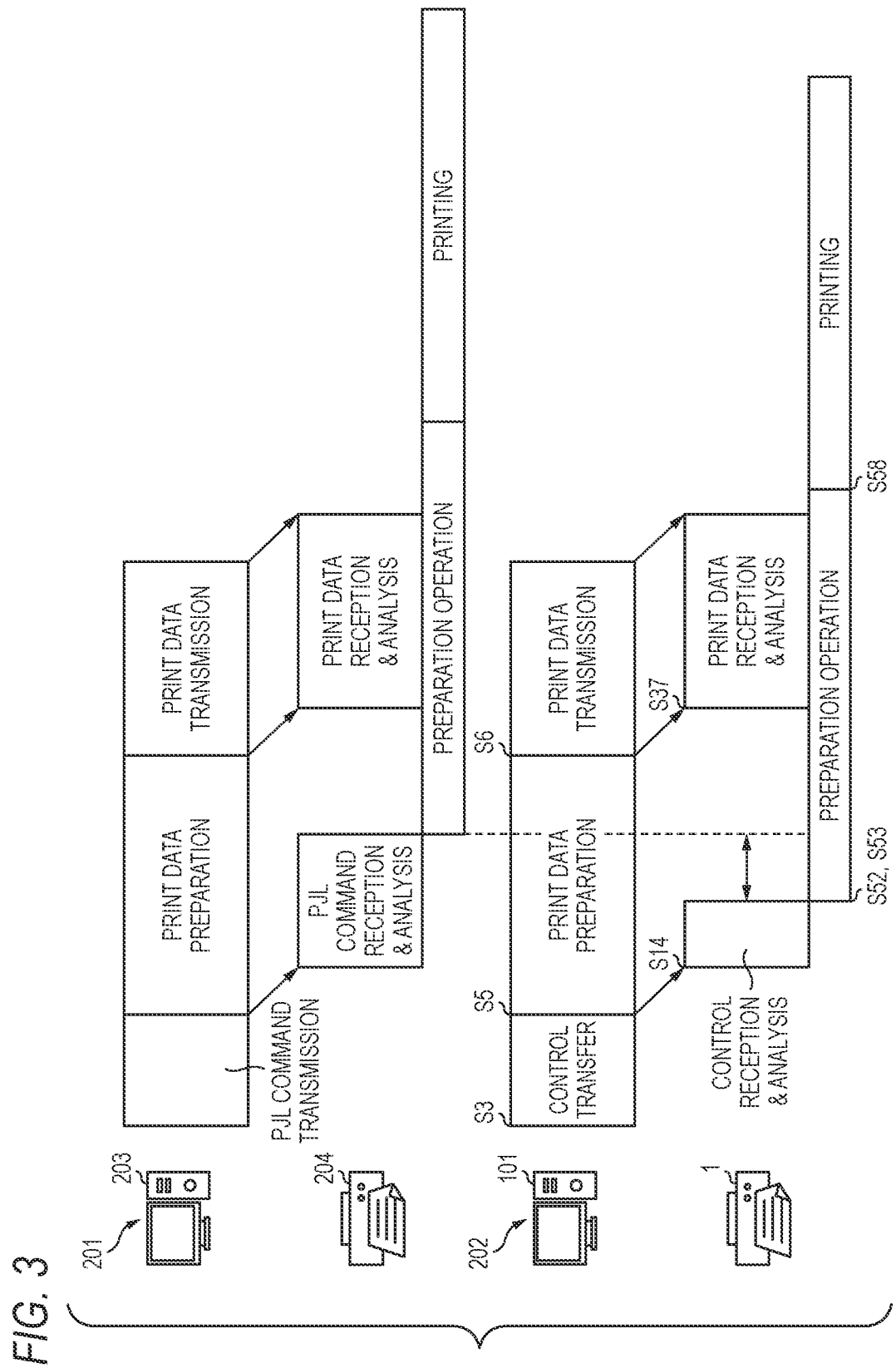
FIG. 3 is a time chart for illustrating a flow of processing of the image forming system shown in FIG. 1.

FIG. 3 is a time chart for illustrating a flow of processing of the image forming system 100 shown in FIG. 1. A reference numeral 201 in FIG. 3 denotes a processing flow of an image forming system of the related art, and a reference numeral 202 in FIG. 3 denotes a processing flow of the image forming system 100 shown in FIG. 1. Here, the flow of processing in the image forming system of the related art is first described.

As indicated by the reference numeral 201 in FIG. 3, in the image forming system of the related art, the PC 203 transmits, to an MFP 204, a preceding command that is a PJL command described in the Printer Job Language (PJL). The PJL command is described to instruct a preparation operation of the image forming unit. When the MFP 204 receives the PJL command from a PC 203, the MFP 204 analyzes the PJL command. When the analysis of the PJL command is completed, the MFP 204 recognizes that the PJL command is a preceding command in which an instruction for the preparation operation of the image forming unit is described, and executes a preparation operation of the image forming unit.

On the other hand, as indicated by the reference numeral 202 in FIG. 3, in the image forming system 100 according to one aspect of the present disclosure, the PC 101 transmits, to the MFP 1, a preceding command described in accordance with a control transfer protocol, which is one of USB connection transfer schemes. Hereinafter, the preceding command is described as being transmitted to the MFP 1 by the PC 101 prior to transmission of print data and as being described to instruct a preparation operation of the image forming unit 4. When the MFP 1 receives the preceding command from the PC 101, the MFP 1 analyzes the preceding command. Thereafter, similarly to the image forming system of the related art, the MFP 1 executes a preparation operation of the image forming unit 4.

A data size of the preceding command described in accordance with the control transfer protocol is smaller than a data size of the PJL command. For this reason, as shown in FIG. 3, the MFP 1 can complete the analysis of the preceding command sooner than a case where the PJL command is received in the MFP 204 of the related art. The preceding command described in accordance with the control transfer protocol is stored in the buffer 12B of the USB interface 12, and the CPU 91 analyzes the preceding command stored in the buffer 12B. Since the buffer 12B of the USB interface 12 is located upstream of the RAM 11, the CPU 91 can analyze the preceding command sooner than the case where the preceding command is stored in the buffer 11B of the RAM 11.

Note that, at a reference numeral 202 in FIG. 3, parts of the numbers of respective steps shown in FIGS. 4 to 6 and FIG. 8 are shown. Hereinafter, processing of the image forming system 100 according to one aspect of the present disclosure will be described in detail.

<Data Transmission Processing of PC 101>

Figure 4:
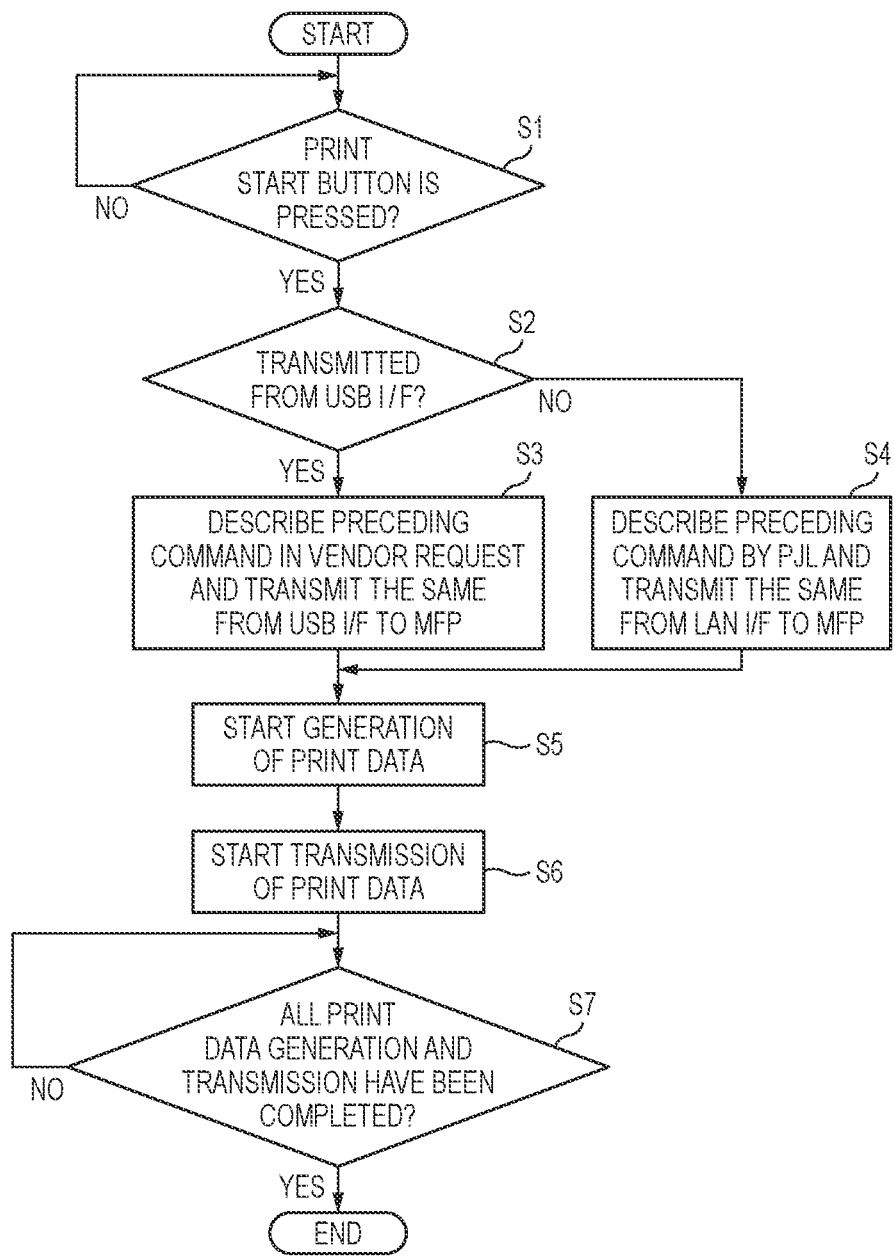
FIG. 4 is a flow chart showing a flow of data transmission processing of the PC shown in FIG. 1.

FIG. 4 is a flow chart showing a flow of data transmission processing of the PC 101 shown in FIG. 1. Note that, a time chart shown at the reference numeral 202 in FIG. 3 and flow charts shown in FIGS. 4 to 8 are examples, and the present disclosure is not limited thereto.

As shown in FIG. 4, the PC 101 waits until a print start button is pressed by a user operation (NO in S1). When the print start button is pressed by a user operation (YES in S1), the PC 101 receives a printing instruction by the user operation and determines whether to transmit a preceding command from the USB interface 102 (S2).

A case where the PC 101 determines to transmit a preceding command from the USB interface 102 (YES in S2) is considered. For the control transfer of USB connection, there is a scheme of transmitting and receiving various commands called a standard request, a class request, and a vendor request. In this case, the PC 101 describes a preceding command in a vendor request of the control transfer, and transmits the vendor request from the USB interface 102 to the USB interface 12 of the MFP 1 via the control transfer (S3). The preceding command transmitted from the USB interface 102 to the USB interface 12 in step S3 is described in accordance with the control transfer protocol.

On the other hand, a case where the PC 101 determines not to transmit a preceding command from the USB interface 102 (NO in S2) is considered. In this case, the PC 101 describes a preceding command by the printer job language and transmits the preceding command from the LAN interface 103 to the LAN interface 13 of the MFP 1 (S4). Note that, in step S4, the PC 101 may transmit the preceding command to the LAN interface 13 of the MFP 1 via the wireless LAN.

After the processing in step S3 or S4, the PC 101 starts generating print data (S5). The print data includes a printing instruction and image data that are transmitted to the MFP 1 by the PC 101. After starting generation of the print data, the PC 101 starts transmitting the print data (S6). At this time, the PC 101 transmits the print data from the USB interface 102 to the USB interface 12 of the MFP 1, or transmits the print data from the LAN interface 103 to the LAN interface 13 of the MFP 1.

The PC 101 determines whether the generation and the transmission have been completed for all print data (S7). When the PC 101 determines that the generation and the transmission have been completed for all print data (YES in S7), the PC ends the data transmission processing. When the PC 101 determines that the generation and the transmission have not been completed for all print data (NO in S7), the PC continues the processing of step S7.

<Data Reception Processing of MFP 1>

Figure 5:
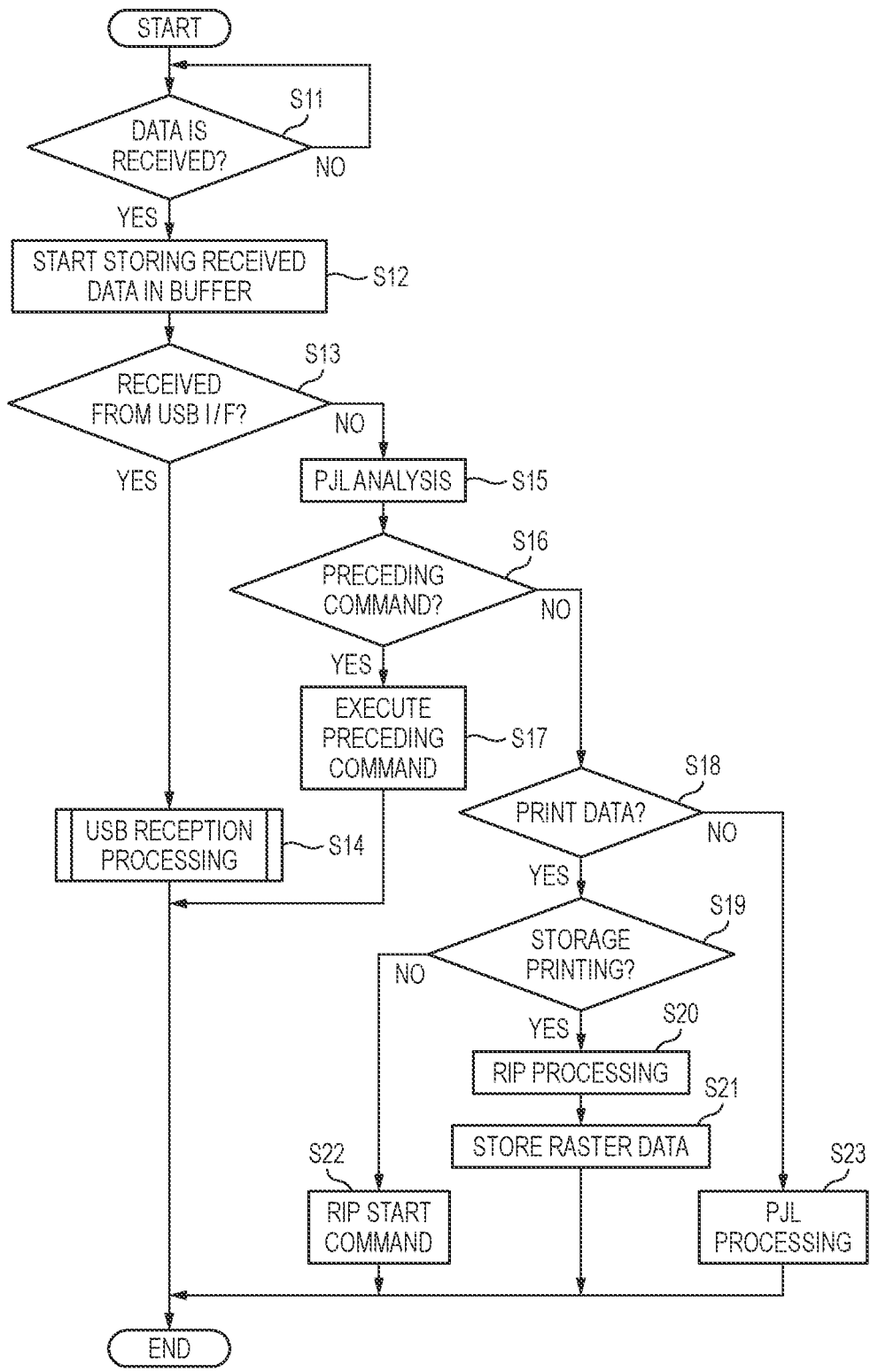
FIG. 5 is a flow chart showing a flow of data reception processing of the MFP shown in FIG. 1.

FIG. 5 is a flow chart showing a flow of data reception processing of the MFP 1 shown in FIG. 1. As shown in FIG. 5, the MFP 1 waits until data is received from the PC 101 (NO in S11). When the MFP 1 receives data from the PC 101 (YES in S11), the MFP 1 starts storing the received data in the buffer 11B or 12B (S12).

The CPU 91 determines whether the data reception in step S11 is reception from the USB interface 102 of the PC 101 (S13). A case in which the CPU 91 determines that the data reception in step S11 is not reception from the USB interface 102, i.e., is reception from the LAN interface 103 (NO in S13) is considered. In this case, the CPU 91 stores the data received by the LAN interface 13 from the LAN interface 103 in the buffer 11B of the RAM 11, and executes PJL analysis for analyzing the data printer job language described in the buffer 11B (S15). Since the PJL analysis is known, the description thereof is omitted.

After the PJL analysis is completed, the CPU 91 determines whether the data subjected to the PJL analysis is a preceding command (S16). When the CPU 91 determines that the data subjected to the PJL analysis is a preceding command (YES in S16), the CPU executes the preceding command (S17). The CPU 91 ends the data reception processing after execution of the preceding command is completed.

When the CPU 91 determines that the data subjected to the PJL analysis is not a preceding command (NO in S16), the CPU determines whether the data subjected to the PJL analysis is print data (S18). When the CPU 91 determines that the data subjected to the PJL analysis is print data (YES in S18), the CPU determines whether the print data is data for storage printing (S19).

Storage printing is printing in which the CPU 91 stores print data received from the PC 101 in the buffer 11B of the RAM 11, and when a user logs in the MFP 1, the logged-in user executes printing of the stored print data. When the CPU 91 determines that the print data is data for storage printing (YES in S19), the CPU executes RIP (Raster Image Processor) processing (S20).

RIP processing includes, for example, analysis processing of sequentially analyzing a plurality of operators of PDF data, construction processing of sequentially constructing drawing objects such as character strings, figures, images and the like indicated by the operators by the analysis processing into an image space of one page, and processing of recording an image of one page constructed by the construction processing into the page memory 11M as raster data. After executing the RIP processing, the CPU 91 stores the raster data in the page memory 11M (S21).

When the CPU 91 determines that the print data is not data for storage printing (NO in S19), the CPU recognizes a RIP start command to instruct start of the RIP processing (S22). When the CPU 91 determines that the data subjected to PJL analysis is not print data (NO in S18), the CPU executes PJL processing, which is processing in accordance with the PJL command that is a command described in the Printer Job Language (S23).

When the data subjected to the PJL analysis is not print data, for example, the data subjected to the PJL analysis is capability information and the like of the MFP 1. In step S23, the PJL processing is processing in which the CPU 91 transmits, for example, capability information and the like of the MFP 1 to the PC 101 using the USB interface 12 or the LAN interface 13.

When the CPU 91 determines that the data reception in step S11 is reception from the USB interface 102 (YES in S13), the CPU executes USB reception processing in the USB interface 12 (S14). The USB reception processing in the USB interface 12 will be described with reference to FIG. 6.

<USB Reception Processing>

Figure 6:
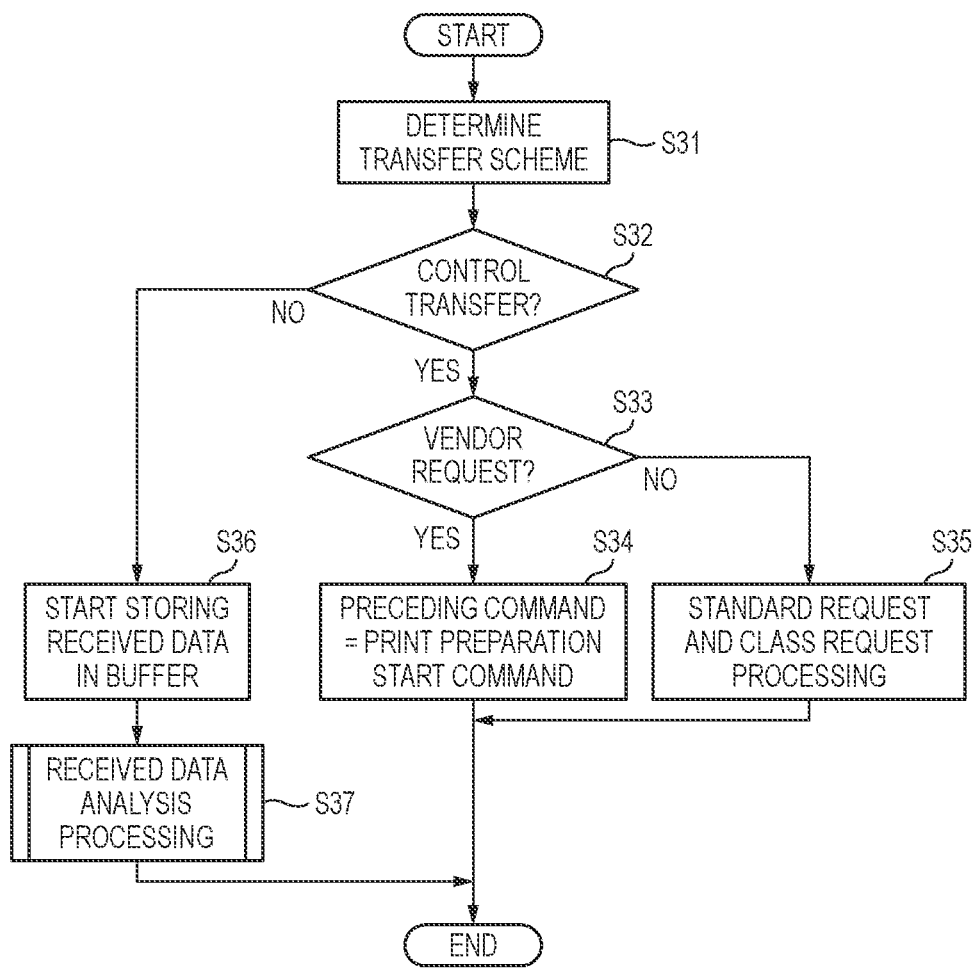
FIG. 6 is a flow chart showing a flow of USB reception processing in step S14 shown in FIG. 5.

FIG. 6 is a flow chart showing a flow of USB reception processing in step S14 shown in FIG. 5. As shown in FIG. 6, the CPU 91 determines a transfer scheme of reception of data of the USB interface 12 in step S11 (S31).

When the transfer scheme determined in step S31 is a control transfer (YES in S32), the CPU 91 determines whether the data received in step S11 is a vendor request (S33). A vendor request is a command described in accordance with the control transfer protocol, and is a command that can be independently defined by a vendor.

If a determination result in step S32 is YES, the USB interface 12 receives a preceding command described in accordance with the control transfer protocol, in the control transfer manner. Since the MFP 1 can quickly recognize reception of the preceding command by receiving the preceding command through the USB interface 12, the MFP 1 can rapidly recognize the preceding command in step S34 described later.

When the CPU 91 determines that the data received in step S11 is a vendor request (YES in S33), the CPU recognizes that the preceding command described in the vendor request is a print preparation start command, which is a command to instruct a preparation operation of the image forming unit 4 (S34). Since the vendor request is a command that can be independently defined by a vendor, it is possible to include, in the vendor request, a preceding command in which a print preparation start command is described.

The print preparation start command includes instructions to start temperature-raising of the heater 45H of the fixing unit 45 and to start driving of the polygon motor 41M. In other words, the print preparation start command includes a heater driving command, which is a command to instruct a driving operation of the heater 45H as the preparation operation of the image forming unit 4. In addition, the print preparation start command includes a motor driving command, which is a command to instruct a driving operation of the polygon motor 41M as the preparation operation of the image forming unit 4.

Thereby, the MFP 1 can recognize the preceding command and execute the driving operation of the heater 45H and the driving operation of the polygon motor 41M as the preparation operation of the image forming unit 4, sooner than the case where the preceding command is described in the Printer Job Language.

When the CPU 91 determines that the data received in step S11 is not a vendor request (NO in S33), the CPU executes processing based on a standard request and a class request by the control transfer, which are prescribed by the USB standard (S35). The CPU 91 executes processing of acquiring a product name, a manufacturer name and the like of the MFP 1 and transmitting the same to the PC 101, as processing based on the standard request.

In addition, the CPU 91 executes processing of acquiring capability information of the MFP 1 and a current status of the MFP 1 and transmitting the same to the PC 101, as processing based on the class request. Since the standard request and the class request are commands whose definitions are determined in the USB standard, a preceding command cannot be described in the standard request and the class request. For this reason, the preceding command is described in the vendor request.

When the transfer scheme determined in step S31 is not the control transfer (NO in S32), the CPU 91 starts storing the data received in step S11 into the buffer 12B (S36). When the transfer scheme determined in step S31 is not the control transfer, the transfer scheme is a bulk OUT transfer. After the CPU 91 starts storing the data received in step S11 into the buffer 12B, the CPU executes received data analysis processing (S37). The received data analysis process will be described with reference to FIG. 7.

<Received Data Analysis Processing>

Figure 7:
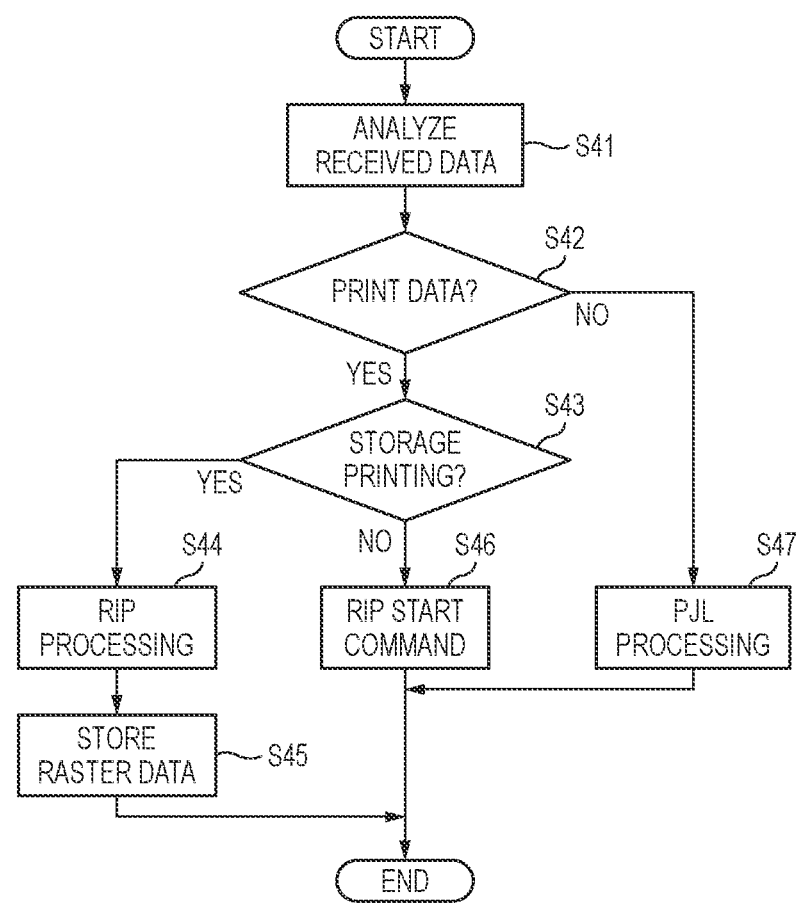
FIG. 7 is a flow chart showing a flow of received data analysis processing in step S37 shown in FIG. 6.

FIG. 7 is a flowchart showing a flow of received data analysis processing in step S37 shown in FIG. 6. As shown in FIG. 7, the CPU 91 executes analysis processing of analyzing the received data received in step S11 in the bulk OUT transfer (S41). Hereinafter, data that is received in the bulk OUT transfer from the USB interface 102 of the PC 101 in step S11 and is described in the Printer Job Language is referred to as received data.

When the CPU 91 determines that the received data analyzed in step S41 is print data (YES in S42), the CPU determines whether the print data is data for storage printing (S43). When the CPU 91 determines that the print data is data for storage printing (YES in S43), the CPU executes RIP processing, similarly to step S20 (S44). After executing the RIP processing, the CPU 91 stores raster data in the page memory 11M, similarly to step S21 (S45).

When the CPU 91 determines that the print data is not data for storage printing, i.e., the print data is data for normal printing (NO in S43), the CPU recognizes a RIP start command, similarly to step S22 (S46). Normal printing is an image forming operation in which, when the CPU 91 receives print data from the PC 101, the CPU executes RIP processing on the received print data to form an image on the sheet S1, using the image forming unit 4.

When the CPU 91 determines that the received data analyzed in step S41 is not print data (NO in S42), the CPU 91 executes PJL processing in accordance with the PJL command described in the received data, similarly to step S23 (S47).

In this way, the MFP 1 can execute the image forming operation by analyzing the received data described in the Printer Job Language and received in the bulk OUT transfer and can execute the processing in accordance with the PJL command.

<Image Forming Control>

Figure 8:
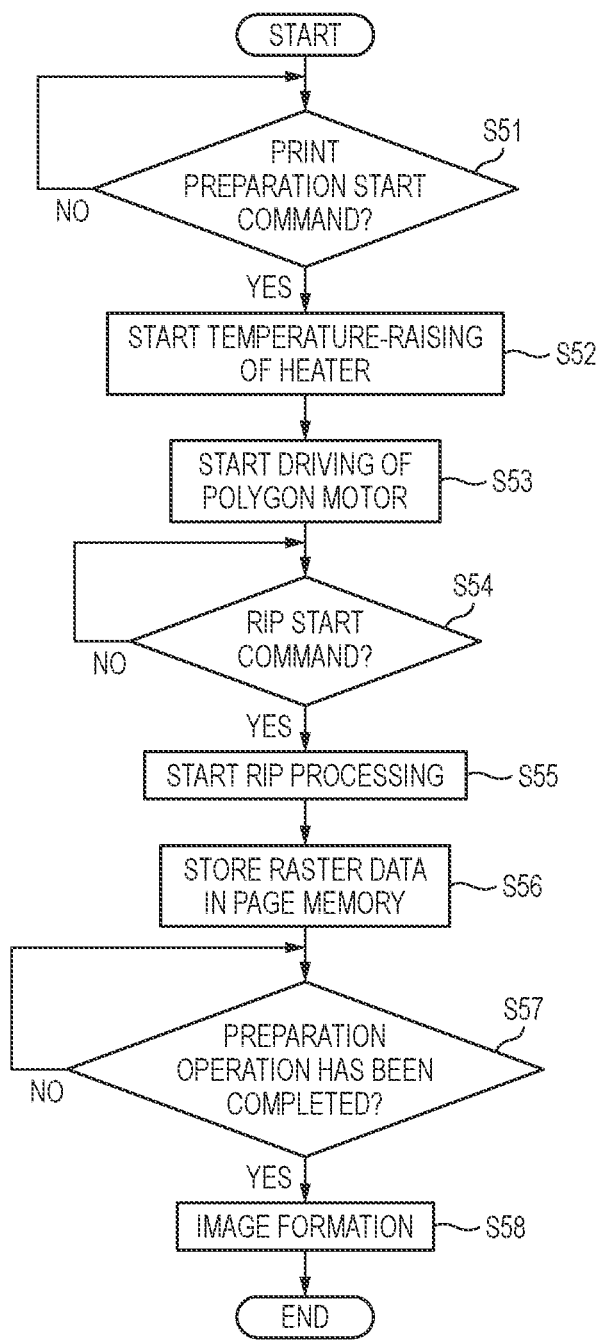
FIG. 8 is a flow chart showing a flow of image formation control of the MFP shown in FIG. 1.

FIG. 8 is a flow chart showing a flow of image formation control of the MFP 1 shown in FIG. 1. As shown in FIG. 8, the CPU 91 waits until the CPU recognizes a print preparation start command in step S34 (NO in S51). When the CPU 91 recognizes the print preparation start command in step S34 (YES in S51), the CPU 91 starts raising a temperature of the heater 45H of the fixing unit 45 (S52).

In addition, the CPU 91 starts driving the polygon motor 41M via the motor driver 41D (S53). In steps S52 and S53, the CPU 91 simultaneously transmits drive signals to the motor driver 41D and the heater 45H. Note that, the present disclosure is not limited thereto, and the CPU 91 may separately transmit drive signals to the motor driver 41D and the heater 45H.

In this way, the CPU 91 executes a drive operation of the heater 45H and the polygon motor 41M as a preparation operation of the image forming unit 4, in response to receiving the preceding command described in accordance with the control transfer protocol, via the USB interface 12.

Next, the CPU 91 waits until the CPU recognizes a RIP start command in step S22 or S46 (NO in S54). When the CPU 91 recognizes the RIP start command in step S22 or S46 (YES in S54), the CPU 91 starts RIP processing (S55). The CPU 91 converts print data into raster data by executing RIP processing.

The CPU 91 stores the raster data in the page memory 11M of the RAM 11 (S56). After storing the raster data in the page memory 11M, the CPU 91 waits until the preparation operation of the image forming unit 4 is completed (NO in S57). When the CPU 91 determines that the preparation operation of the image forming unit 4 has been completed (YES in S57), the CPU executes an image forming operation of forming an image of the print data on the sheet S1, using the image forming unit 4 (S58).

With the above, the MFP 1 receives the preceding command described in accordance with the control transfer protocol to instruct the preparation operation of the image forming unit 4. A data size of the preceding command described in accordance with the control transfer protocol is smaller than a data size of a preceding command described in the Printer Job Language. For this reason, the MFP 1 can recognize the preceding command and execute the preparation operation of the image forming unit 4, sooner than the case where the preceding command is described in the Printer Job Language.

Note that, the technical scope of one aspect of the present disclosure also includes a computer-readable storage medium on which a program for controlling the image forming system 100 is stored. The storage medium stores a program for causing the PC 101 to execute a step of transmitting a preceding command described in accordance with the control transfer protocol to the MFP 1, in the control transfer manner.

SECOND EMBODIMENT

Figure 9:
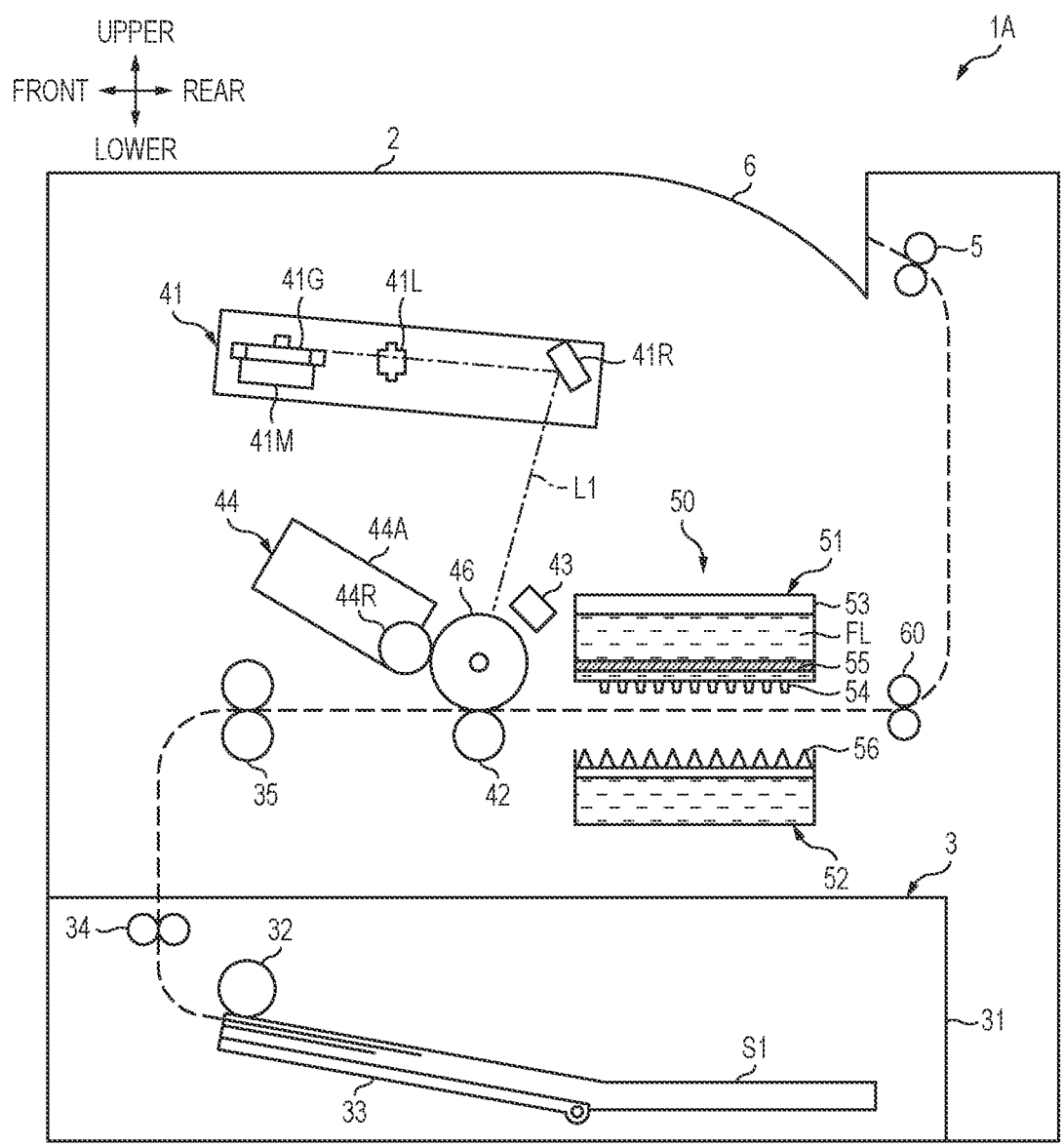
FIG. 9 shows an internal configuration of an MFP.

In the below, a second embodiment of the present disclosure is described. Note that, for convenience of description, the members having the same functions as the members described in the first embodiment are denoted with the same reference signs, and the descriptions thereof are not repeated. FIG. 9 shows an internal configuration of an MFP 1A according to a second embodiment of the present disclosure. As shown in FIG. 9, the MFP 1A is different from the MFP 1 in that the fixing unit 45 is changed to a fixing unit 50 and a conveying roller 60 is provided.

The fixing unit 50 includes a spray unit 51 and a collection tray 52. The spray unit 51 is a device configured to spray a fixing solution FL for fixing a developer image formed on the sheet S1 to the sheet S1. The spray unit 9A has a housing 53, a plurality of nozzles 54, a nozzle electrode 55 and an opposite electrode 56.

The fixing solution FL is accommodated in the housing 53. The fixing solution FL accommodated in the housing 53 is supplied to the plurality of nozzles 54, and is applied with a voltage by the nozzle electrodes 55. The fixing solution FL to which the voltage has been applied is sprayed from the plurality of nozzles 54 toward the developer image formed on the surface of the sheet S1.

The opposite electrode 56 has a plurality of protrusions and is arranged on an upper part of the collection tray 52 to face the nozzles 54. The opposite electrode 56 is applied with a voltage. Below the spray unit 51, there is provided the collection tray 52 configured to receive and accommodate the fixing solution FL sprayed from the nozzles 54. The collection tray 52 is formed of an insulating material.

The conveying roller 60 is provided downstream of the fixing unit 50 with respect to the conveying direction, and is configured to convey the sheet S1 on which the developer image has been formed by the spray unit 51 toward the discharge roller 5 side. The sheet S1 conveyed by the conveying roller 60 is conveyed by the discharge roller 5 and discharged onto the upper surface of the discharge tray 6.

Figure 10:
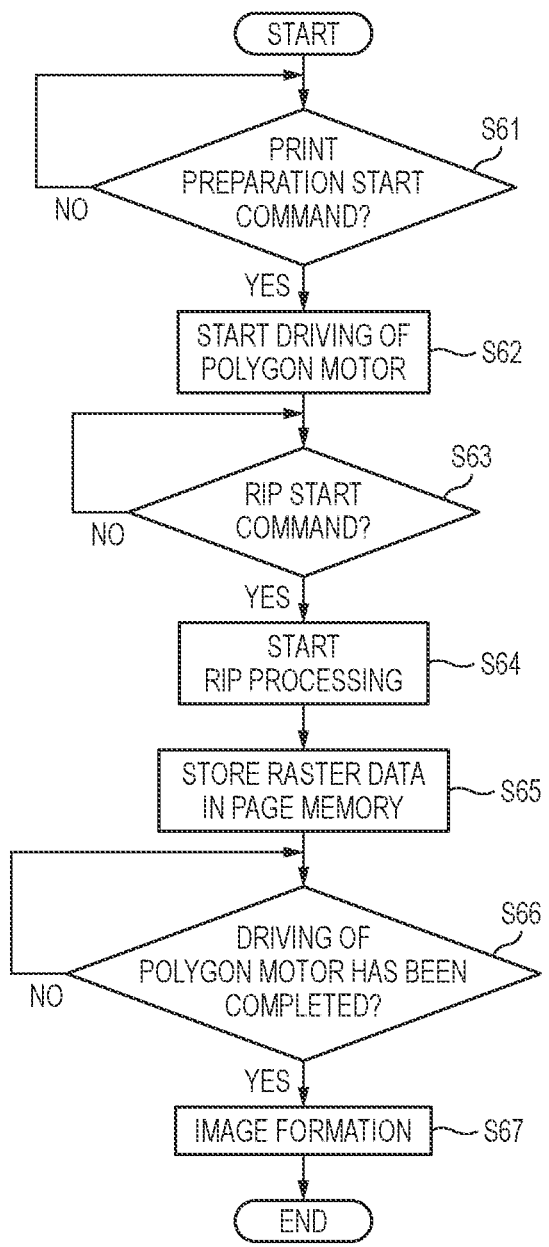
FIG. 10 is a flow chart showing a flow of image formation control of the MFP shown in FIG. 9.

FIG. 10 is a flow chart showing a flow of image formation control of the MFP 1A shown in FIG. 9. Steps S61 to S65 and S67 are similar to steps S51, S53 to S56 and S58 shown in FIG. 8, and therefore, descriptions thereof are omitted. Note that, the flow chart shown in FIG. 10 is an example, and the present disclosure is not limited thereto.

Since the MFP 1A does not have the heater 45H, the print preparation start command includes a motor drive command, but does not include a heater drive command. Therefore, the CPU 91 does not execute the processing of starting the temperature-raising of the heater 45H in step S52. After the processing of step S65, the CPU 91 waits until the driving of the polygon motor 41M is completed (NO in S66). When the CPU 91 determines that the driving of the polygon motor 41M has been completed (YES in S66), the CPU proceeds to step S67.

<Implementation Example by Software>

The control blocks (particularly the ASIC 9) of the MFP 1 and the control blocks of the PC 101 may be implemented by logic circuits (hardware) formed on an integrated circuit (IC chip) or the like, or may be implemented by software.

In the case of the latter, the MFP 1 and the PC 101 each include a computer configured to execute instructions of a program that is software for implementing each function. The computer includes, for example, one or more processors, and also includes a computer-readable storage medium having the program stored thereon. In the above computer, the processor reads the program from the storage medium and executes the same, so that the object of the present disclosure is achieved. As the processor, for example, a CPU may be used. As the storage medium, a "non-transitory tangible medium" such as a ROM, a tape, a disc, a card, a semiconductor memory or a programmable logic circuit may be used. Further, a RAM or the like may also be provided for developing the program. The program may also be supplied to the computer described above via any transmission medium (a communication network, broadcast waves, and the like) capable of transmitting the program. Note that, one aspect of the present disclosure is that the program can be implemented in the form of data signals embedded in a carrier wave, as embodied in electronic transmission.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image forming apparatus comprising:
   an image forming unit configured to form an image on a sheet:
   a USB interface configured to be connected to an external terminal via a USB; and
   a controller,
   wherein the controller is configured to receive data from the external terminal via the USB interface,
   the controller is configured to determine whether a transfer scheme of the USB interface in a case where the controller receives the data is a control transfer or a bulk OUT transfer,
   in a case where the data received from the external terminal is received in the control transfer and is a preceding command described in accordance with a control transfer protocol, the preceding command being described to instruct a preparation operation of the image forming unit, the controller is configured to execute the preparation operation of the image forming unit,
   in a case where the data received from the external terminal is received in the bulk OUT transfer and is print data described in a Printer Job Language, the controller is configured to execute an image forming operation of forming an image of the print data on the sheet, using the image forming unit, in a case where the transfer scheme of the USB interface is the control transfer and the data received from the external terminal is the preceding command described in a vendor request of the control transfer, execute the preparation operation of the image forming unit, and in a case where the transfer scheme of the USB interface is the control transfer and the data received from the external terminal is not the preceding command described in the vendor request of the control transfer, execute processing based on a standard request and a class request by the control transfer.

2. The image forming apparatus according to claim 1, wherein in a case where the transfer scheme of the USB interface is a bulk OUT transfer, the controller is configured to:

execute analysis processing of analyzing received data transmitted from the external terminal and described in a Printer Job Language, the received data being received in a bulk OUT transfer;

execute, in a case where the analyzed received data is print data, an image forming operation of forming an image of the print data on the sheet, using the image forming unit; and execute, in a case where the analyzed received data is not the print data, processing in accordance with a PJL command in the received data, the PJL command being described in the Printer Job Language.

3. The image forming apparatus according to claim 2, wherein the image forming unit comprises a fixing unit having a heater and configured to heat a sheet on which an image is formed, using the heater, and wherein the preceding command includes a heater driving command that is a command to instruct a driving operation of the heater as the preparation operation of the image forming unit.

4. The image forming apparatus according to claim 2, wherein the image forming unit comprises:

a photosensitive member;

a polygon mirror configured to deflect a light beam in a direction heading toward the photosensitive member; and a polygon motor configured to rotationally drive the polygon mirror, and wherein the preceding command includes a motor driving command that is a command to instruct a driving operation of the polygon motor as the preparation operation of the image forming unit.

5. The image forming apparatus according to claim 1, wherein the image forming unit comprises a fixing unit having a heater and configured to heat a sheet on which an image is formed, using the heater, and wherein the preceding command includes a heater driving command that is a command to instruct a driving operation of the heater as the preparation operation of the image forming unit.

6. The image forming apparatus according to claim 1, wherein the image forming unit comprises:

a photosensitive member;

a polygon mirror configured to deflect a light beam in a direction heading toward the photosensitive member; and a polygon motor configured to rotationally drive the polygon mirror, and wherein the preceding command includes a motor driving command that is a command to instruct a driving operation of the polygon motor as the preparation operation of the image forming unit.

7. An image forming system comprising:

an image forming apparatus; and an external terminal, wherein the image forming apparatus comprises:

an image forming unit configured to form an image on a sheet;

a USB interface configured to be connected to the external terminal via a USB; and a controller, wherein the controller is configured to receive data from the external terminal via the USB interface, the controller is configured to determine whether a transfer scheme of the USB interface in a case where the controller receives the data is a control transfer or a bulk OUT transfer, in a case where the data received from the external terminal is received in the control transfer and is a preceding command described in accordance with a control transfer protocol, the preceding command being described to instruct a preparation operation of the image forming unit, the controller is configured to execute the preparation operation of the image forming unit; and in a case where the data received from the external terminal is received in the bulk OUT transfer and is print data described in a Printer Job Language, the controller is configured to execute an image forming operation of forming an image of the print data on the sheet, using the image forming unit, the external terminal is configured to transmit the preceding command to the image forming apparatus in a case where the external terminal receives a printing instruction, and in a case where the transfer scheme of the USB interface is the control transfer and the data received from the external terminal is the preceding command described in a vendor request of the control transfer, execute the preparation operation of the image forming unit, and in a case where the transfer scheme of the USB interface is the control transfer and the data received from the external terminal is not the preceding command described in the vendor request of the control transfer, execute processing based on a standard request and a class request by the control transfer.

8. A non-transitory computer-readable storage medium storing a program executable by a computer of the external terminal and used for controlling the image forming system according to claim 7, the program comprising instructions that, when executed by the computer, cause the external terminal to perform:

transmitting the preceding command to the image forming apparatus.

* * * * *